United States Patent [19]

Olson et al.

[11] Patent Number: 5,761,094
[45] Date of Patent: Jun. 2, 1998

[54] VEHICLE COMPASS SYSTEM

[75] Inventors: Thomas R. Olson; James R. Geschke, both of Holland; Steven L. Geerlings, Zeeland, all of Mich.

[73] Assignee: Prince Corporation, Holland, Mich.

[21] Appl. No.: 588,563

[22] Filed: Jan. 18, 1996

[51] Int. Cl.$^6$ .................................................. G01C 17/38
[52] U.S. Cl. .......................... 364/559; 33/355 R; 33/356; 73/1.75; 73/1.76; 324/202; 324/244; 324/245
[58] Field of Search ................... 364/559, 424.01, 364/457, 571.01, 434; 33/356, 355 R, 357; 73/1 E, 1 R, 1.75, 1.76; 340/979, 988, 989; 324/202, 244, 245, 246

[56] References Cited

U.S. PATENT DOCUMENTS

| | | | |
|---|---|---|---|
| 4,341,023 | 7/1982 | Marcus et al. | 33/363 K |
| 4,424,631 | 1/1984 | Franks | 33/361 |
| 4,425,717 | 1/1984 | Marcus | 33/361 |
| 4,505,054 | 3/1985 | Clark et al. | 33/357 |
| 4,546,551 | 10/1985 | Franks | 33/356 |
| 4,677,381 | 6/1987 | Geerlings | 33/356 |
| 4,743,913 | 5/1988 | Takai . | |
| 4,797,841 | 1/1989 | Hatch | 364/571.04 |
| 4,831,563 | 5/1989 | Ando et al. | 364/571.05 |
| 4,866,627 | 9/1989 | Suyama | 364/457 |
| 4,890,233 | 12/1989 | Ando et al. | 364/457 |
| 4,953,305 | 9/1990 | Van Lente et al. | 33/356 |
| 5,046,031 | 9/1991 | Wanous | 364/571.02 |
| 5,165,269 | 11/1992 | Nguyen | 73/1 E |
| 5,339,246 | 8/1994 | Kao | 364/457 |
| 5,345,382 | 9/1994 | Kao | 364/424.01 |
| 5,390,122 | 2/1995 | Michaels et al. | 364/443 |
| 5,440,303 | 8/1995 | Kinoshita | 340/901 |
| 5,442,340 | 8/1995 | Dykema | 340/825.22 |
| 5,511,319 | 4/1996 | Geerlings et al. | 33/356 |
| 5,581,899 | 12/1996 | Brechler et al. | 33/356 |

*Primary Examiner*—James P. Trammell
*Assistant Examiner*—Tony M. Cole
*Attorney, Agent, or Firm*—Price, Heneveld, Cooper, DeWitt & Litton

[57] ABSTRACT

A vehicle compass system having a magnetic field sensor coupled to a processing circuit which samples the sensor data and implements a calibration routine that generates compensation signals to compensate the sensor for the effects of vehicular magnetism so that accurate heading information can be displayed on a display coupled to the processing circuit. If the signal levels detected are outside of a variable threshold, then the calibration routine is run. Also provided is a circuit for receiving vehicle position information in response to which the processing circuit adjusts the signals supplied to the display in order to account for magnetic variations between the true north and magnetic north.

27 Claims, 18 Drawing Sheets

VEHICLE COMPASS SYSTEM

BACKGROUND OF THE INVENTION

The present invention relates to magnetic direction sensing systems and particularly those for use in vehicles.

U.S. Pat. No. 4,953,305, assigned to the present assignee, discloses a magnetic field sensor and microprocessor controlled compass system for a vehicle. The system senses the magnitude of the earth's magnetic field in two channels of measurement. The sensor data, if plotted on an X-Y coordinate plane, would be as shown in FIG. 1. For a properly calibrated compass, the plot of sensor data creates a perfect circle centered around the origin of the coordinate plane when the vehicle travels in a 360° loop, as indicated by graph A of FIG. 1. The radius of the circle represents the detected earth's magnetic field strength, and the vehicle's compass heading at a particular time during travel is represented by a point on the circle. By calculating the angle which the point forms with the X-Y coordinate plane, the compass heading of the vehicle may be determined. As is known, depending on the location of the vehicle, the detected magnitude of the earth's magnetic field can vary significantly.

The sensed magnetic field will also be affected if there is a change in vehicular magnetism. Changes in the magnetism of a vehicle can be caused by, for example, driving the vehicle near the electrical power feeders of train or subway systems, installing a magnetic cellular antennae on the vehicle's roof, parking under an AC powerline, or even driving through a car wash which can flex the sheet metal in the vicinity of the compass sensor and change its magnetic characteristics. Such a change in vehicular magnetism will cause the magnetic field sensed by the compass channels when the vehicle is heading in a given direction to be either greater or lesser than that expected for a vehicle with no magnetic interference. As a result, the plot of sensor data will be shifted away from the origin of the coordinate plane in some direction, resulting in a circle such as graph B of FIG. 1 when the vehicle travels a 360° loop. The magnitude of the shift of sensor data is proportional to the magnitude of the change in vehicular magnetism.

The compass system of the above-mentioned patent provides automatic and continuous calibration to account for changes in the vehicle's magnetism and thus the system's reaction to the earth's magnetic field during the life of the vehicle. The calibration system includes means for testing the data received from the compass sensor to determine the maximum and minimum signal levels during movement of the vehicle through a completed 360° path of travel. This data is averaged over several such paths of vehicular travel to provide continuously updated and averaged compensation correction information. The automatic and continuous calibration is capable of correcting the compass system when the plot of sensor data experiences small shifts away from the origin of the coordinate plane due to small drifts in vehicular magnetism. The origin of the coordinate plane in these circumstances is still contained within the circle plotted when the vehicle travels a 360° loop, and the crossings of the sensor data on the axes of the coordinate plane are used to calculate the spans of the signal levels along each axis which determine the center of the circular plot of sensor data. Compensation signals are then generated based on the difference between the center of the circle and the origin of the coordinate plane. However, if the shift of sensor data is large enough such that the origin of the coordinate plane is not contained within the circular plot of sensor data created when the vehicle travels a 360° loop, then heading information cannot be calculated and the calibration system cannot provide correction in this somewhat unusual situation unless the sensor data experiences a subsequent shift that causes the origin of the coordinate plane to again be contained. Because such a subsequent shift may never occur or, if it does, may occur only after an undesirably long period of time, the compass system of the above-mentioned patent provides means by which to reinitiate the calibration system in these situations.

Reinitiation of the calibration system involves the collecting and centering of spans of sensor data followed by the collecting and centering of two circles of sensor data which causes the origin of the coordinate plane to coincide with the center of the circular plot of sensor data. As such, the reinitiation process enables the compass system to recover from any change in vehicular magnetism and to provide accurate heading information. In order to detect situations where reinitiation of the calibration system is desirable, it is known to have the compass system maintain saturation limits at the outer boundaries of the range of measurement of the sensor data. For 8-bit sensor data, these saturation limits are at 0 and 255, as shown in FIG. 1. If a large change in vehicular magnetism causes the sensor data to shift and the current data is plotted outside of these limits for a continuous period of five minutes, then the calibration system is restarted. Such a shift is shown by graph C of FIG. 2, with the dashed portion thereof indicating the range of heading directions of the vehicle that would cause the sensor data to remain outside of the saturation limits. However, intermediate changes in vehicular magnetism are possible which, while causing the plot of sensor data to shift and to not contain the origin of the coordinate plane when the vehicle completes a 360° loop, do not cause the sensor data to be plotted outside of the saturation limits. Such a shift is shown by graph D of FIG. 3. As such, it is known to also provide for a reinitiation of the calibration system if fifteen ignition cycles of at least five minutes duration are completed without obtaining a crossing point on the axes of the X-Y coordinate plane. Furthermore, it is known to enable the operator of the vehicle to manually cause reinitiation of the calibration system by operating a switch, button, or the like. Manual reinitiation would most likely occur when the operator notices that the displayed heading information is erroneous for an extended period of time.

The above-mentioned means by which to cause reinitiation of the calibration system enables the compass system to ultimately recover from changes in vehicular magnetism of any magnitude. However, the time period required to complete fifteen ignition cycles of at least five minutes duration is an undesirably long period of time for the compass system to remain uncalibrated after an intermediate change in vehicular magnetism is experienced causing a shift in sensor data such as that shown by graph D of FIG. 3. Thus, there exists a need for a quicker means by which to automatically cause reinitiation of the calibration system in these circumstances.

The compass system of the above-mentioned patent also provides means by which to correct for variations in the earth's magnetic field. These variations occur in different geographic areas and, in the United States, create 15 different recognized magnetic field or variation zones. Correction is achieved in the compass system by subtracting a variation error from the compass signal used to update the displayed vehicle heading. This variation error depends on the geographic area of operation of the vehicle and must be manually set by the vehicle dealer or someone with comparable technical know-how. When the geographic area of operation of the vehicle changes such that a different variation zone is entered, the variation error must be manually adjusted in order to have appropriate variation correction. Although this variation correction works well, implementation may be cumbersome if frequent changes are made in the vehicle's area of operation which necessitate adjustment of the variation error. As such, there exists a need for a compass system that can more easily adjust for changes in the geographic area of operation of the vehicle so that appropriate variation correction can be continually provided.

SUMMARY OF THE INVENTION

The present invention enables an improved vehicle compass system to be provided having automatic and continuous calibration that can more quickly recover from intermediate changes in vehicular magnetism. A compass system is also provided that can more easily adjust for changes in the geographic area of operation of the vehicle so that appropriate variation correction can be continually provided.

The environment in which the present invention finds application is a compass system having a magnetic field sensor for mounting within a vehicle and from which the earth's magnetic field can be detected. The sensor is coupled to a processing circuit which samples the sensor data. The processing circuit implements a calibration system that generates compensation signals to compensate the sensor for the effects of vehicular magnetism so that accurate heading information can be displayed on a display coupled to the processing circuit. The calibration system is capable of reinitiation which enables the compass system to recover from any change in vehicular magnetism. The present invention provides a variable threshold against which the signal levels of the sensor data are compared. If the signal levels are detected to be outside of the threshold, the calibration system is reinitiated.

In the general compass environment described above, the present invention also provides a communication circuit for receiving vehicle position information. In response to this vehicle position information, the processing circuit adjusts the signals supplied to the display in order to correct for geographic variations in the earth's magnetic field.

These and other features, advantages and objects of the present invention will be further understood and appreciated by those skilled in the art by reference to the following specification, claims and appended drawings.

BRIEF DESCRIPTION OF THE DRAWINGS

FIG. 2 is a flow diagram for the programming of the microprocessor of the alternate embodiment of the compass system shown in FIG. 19.

DETAILED DESCRIPTION OF PREFERRED EMBODIMENT

Figure 5:
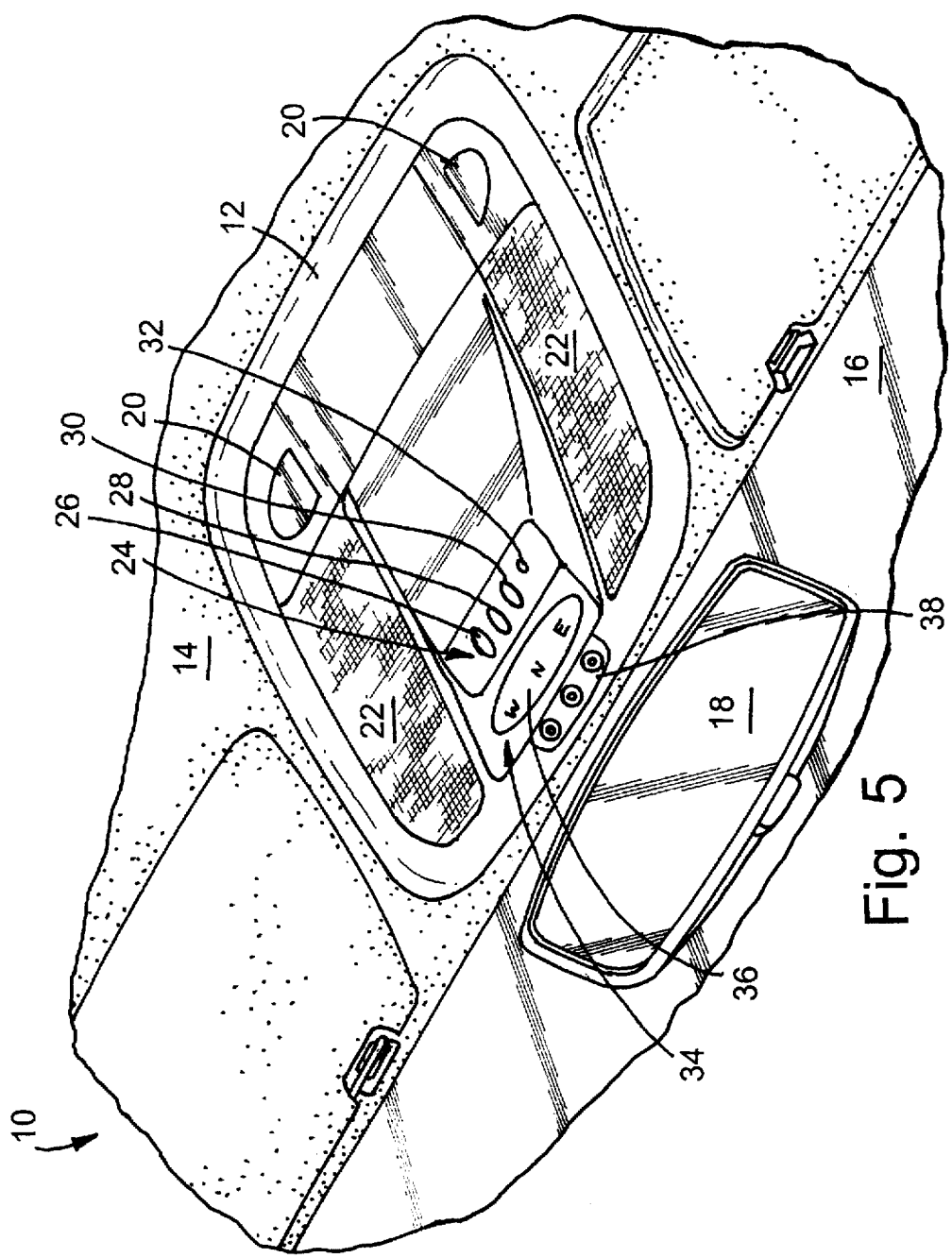
FIG. 5 is a fragmentary perspective view of a vehicle embodying the present invention.

In FIG. 5, there is shown a vehicle 10 such as an automobile which includes an overhead console 12 mounted to the roof 14 of the vehicle during manufacture, although it could be separately added at a later time. Console 12 is centered near the top edge of windshield 16 typically above the rearview mirror 18 and includes a pair of switches 20 for operating lamps positioned behind lenses 22 which in turn direct illumination into the lap area of either the driver or passenger side of the vehicle depending on which switch is actuated. The center of the console includes a trainable garage door opening transmitter 24 of the type disclosed in allowed U.S. Pat. No. 5,442,340. This trainable transmitter can learn the RF frequency, modulation scheme, and security code of up to three existing remote transmitters. Thus, console 12 including trainable transmitter 24, can replace three separate remote control transmitters usually loosely stored in the vehicle. The transmitter includes three control switches 26, 28, and 30 and an indicator LED 32 for the display of training prompting information to the vehicle operator. Console 12 also includes a display panel 34, the center of which includes a digital display 36 providing, in one embodiment of the invention, a sixteen point compass display of the vehicle heading. Console 12 also includes compass and display control switches 38 and the compass circuit shown in FIG. 6 which is appropriately mounted therein.

Figure 6:
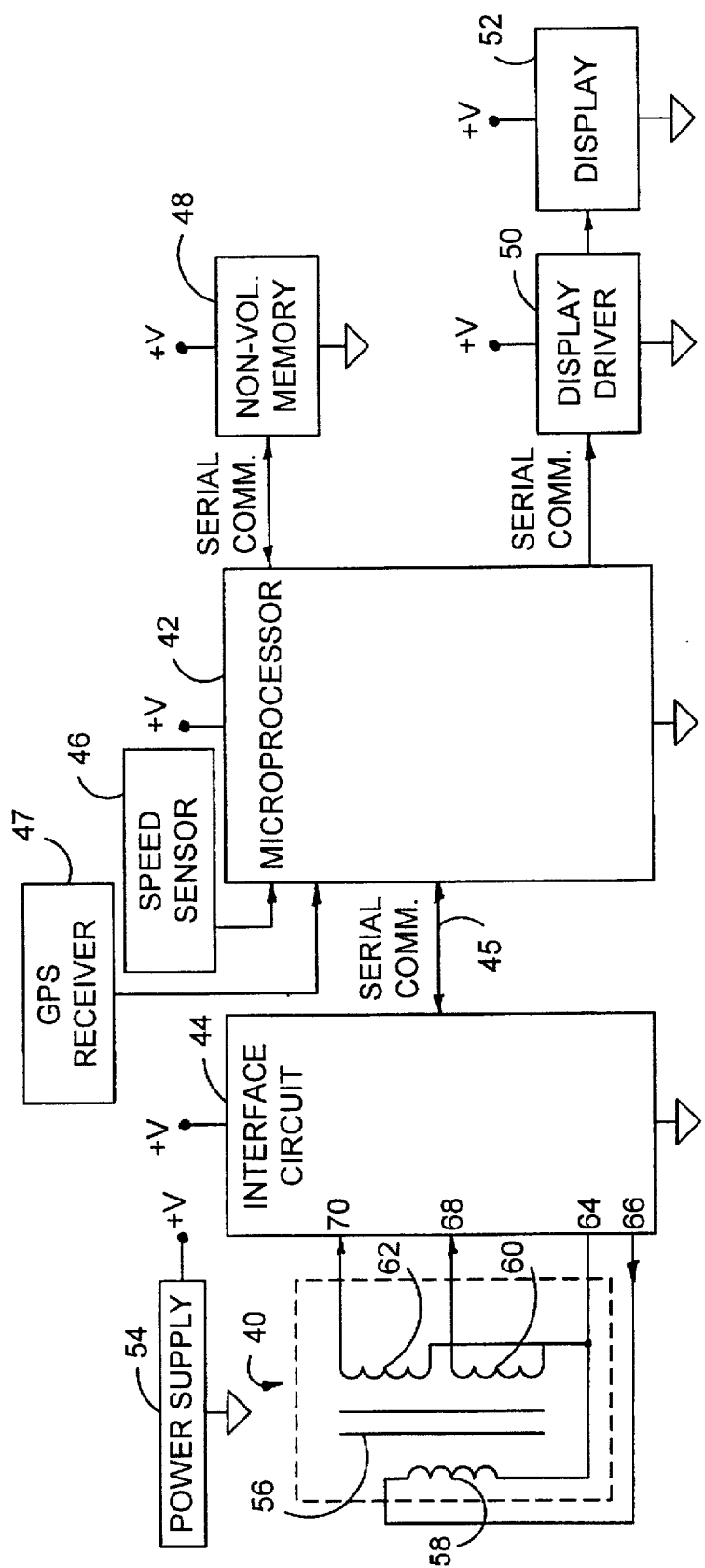
FIG. 6 is an electrical circuit diagram of the compass system embodying the present invention.

Referring now to FIG. 6, the compass system includes a magnetic field sensor 40 coupled to a microprocessor 42 through an electrical interface circuit 44. In the preferred embodiment, microprocessor 42 is a HC05 8-bit microprocessor manufactured by the Motorola Corporation. Microprocessor 42 and circuit 44 are coupled via serial communication line 45, and comprise a processing circuit for processing electrical signals generated from sensor 40. Also coupled to microprocessor 42 in a conventional manner is a speed sensor 46 for detecting vehicle movement, a GPS (Global Positioning System) receiver or communication circuit 47 for obtaining satellite-based vehicle position information, a nonvolatile memory circuit 48 for storing compass data, a display driver 50, and a display 52 for displaying heading information to the operator of the vehicle in response to display output signals generated by microprocessor 42. In one embodiment, speed sensor 46 can be an inductive pick-up from the drive shaft of the vehicle and from which a frequency-based speed signal is obtained which provides a certain number of pulses per mile traveled by the vehicle. Display 52 is a 16-point display in the preferred embodiment, although it can be any type of display including an alphanumeric- or graphic-type display. Power supply circuit 54 provides operating voltage to all of the components of the compass system. The functioning and interconnection of these circuits is now described in greater detail.

Sensor 40 is a flux-gate sensor in the preferred embodiment, although other types of magnetic field sensors may be employed. Sensor 40 includes an annular core 56 around which is wound a primary winding 58, a secondary east/west sensing winding 60, and a secondary north/south sensing winding 62. Terminal 64 of circuit 44 is held at 2.5 volts and provides an intermediate reference ground for the windings of sensor 40. Primary winding 58 is driven by 0- to 5-volt signals supplied from terminal 66 of circuit 44 to selectively drive annular core 56 into saturation. Secondary sensing windings 60 and 62 supply electrical signals representing the magnetic field sensed within the vehicle to terminals 68 and 70, respectively, of circuit 44 in a well-known manner.

Circuit 44 essentially serves as an interface between sensor 40 and microprocessor 42, performing the same functions as the corresponding individual circuit components of the interfacing circuitry detailed in U.S. Pat. No. 4,953,305, issued on Aug. 4, 1990, entitled VEHICLE COMPASS WITH AUTOMATIC CONTINUOUS CALIBRATION, assigned to the present assignee and incorporated herein by reference. Interface circuit 44 preferably is an application specific integrated circuit (ASIC) essentially incorporating the individual circuits of the prior interfacing circuitry in a conventional manner to reduce the cost of the compass system. Circuit 44 converts the analog electrical signals supplied by sensing windings 60 and 62 to 8-bit digital signals (count values). These digital signals represent the magnetic field strength, in milligauss, detected by sensing windings 60 and 62 representing the two channels of compass information. In the preferred embodiment, each count of these count values represents five milligauss of magnetism. The digital signals are supplied to microprocessor 42 over serial communication line 45.

Microprocessor 42 processes the digital signals supplied by circuit 44 and generates compass compensation signals if necessary to account for changes in vehicular magnetism. These compensation signals are supplied to circuit 44 via serial communication line 45 and, after conversion therein from digital to analog, are supplied directly to secondary sensing windings 60 and 62 via terminals 68 and 70, respectively. In particular, DC currents are supplied to sensing windings 60 and 62 which create a static magnetic field that interacts with the field being measured by sensor 40. For a properly calibrated compass, this combined field eliminates the effects of any magnetic interferences such that sensor 40 provides analog electrical signals representative only of the magnetic field of the earth so that accurate heading information can be provided. Although this method of compass compensation is employed in the preferred embodiment of the present invention, other embodiments may provide different means of correction. For example, circuit 44 may supply voltage or frequency signals to compensate sensor 40 which, as mentioned above, may be any type of magnetic field sensor. Furthermore, correction may be achieved by compensating the signals supplied to display 52 instead of altering the sensing of the magnetic field itself, as described above.

Figure 1:
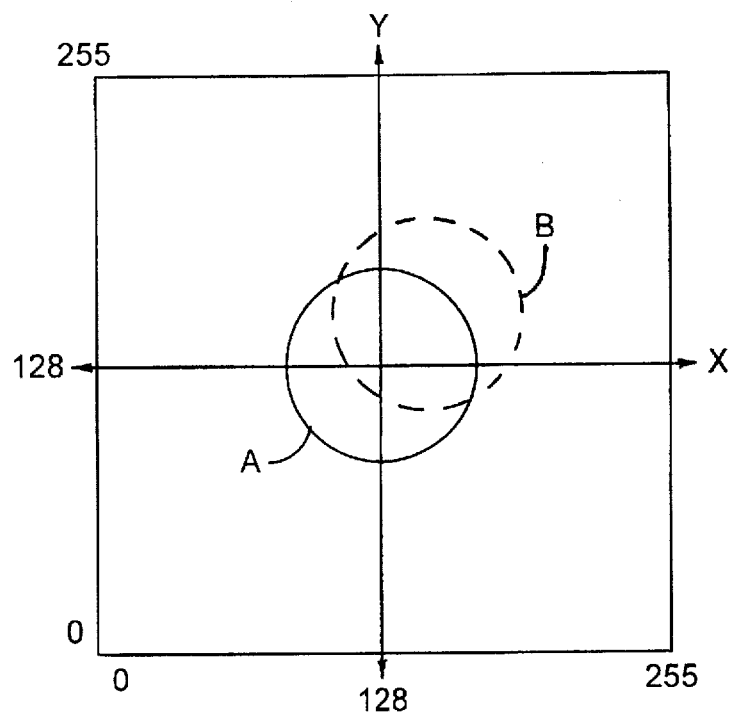
FIG. 1 is a graph illustrating the ideal signal representing the sensed magnetic field of the earth when the vehicle travels in a 360° loop, and the signal after a change in vehicular magnetism.
Figure 2:
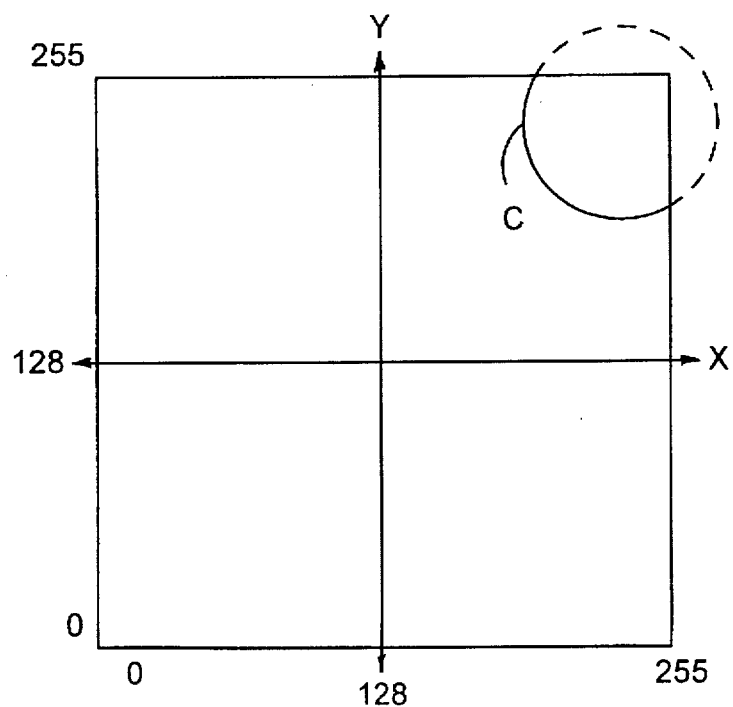
FIG. 2 is a graph illustrating the signal representing the sensed magnetic field of the earth after a large change in vehicular magnetism causing the saturation limits of the compass to be exceeded.
Figure 3:
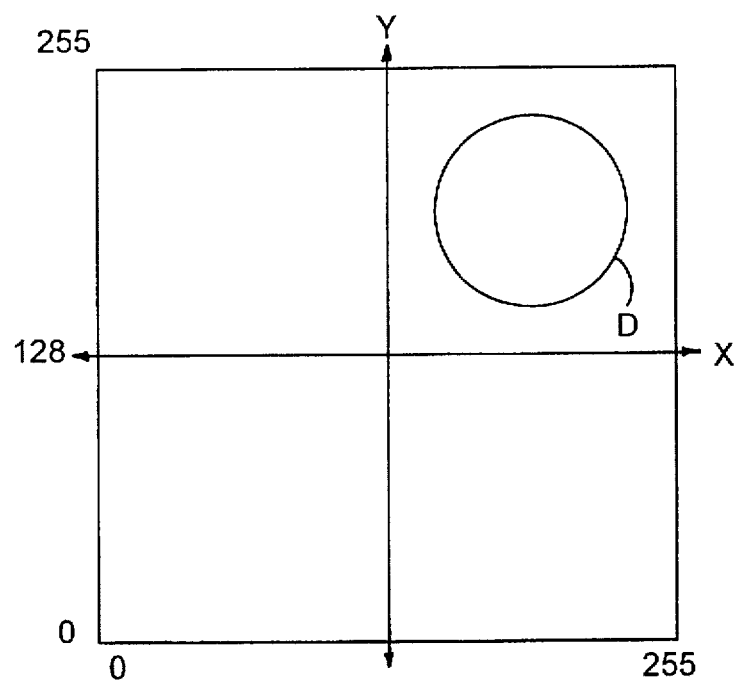
FIG. 3 a graph illustrating the signal representing the sensed magnetic field of the earth after an intermediate change in vehicular magnetism.

The digital signals supplied by circuit 44 to microprocessor 42, representing the magnetic field sensed by the north/south and east/west channels of sensor 40, can be plotted on an X-Y coordinate plane, as shown in FIGS. 1-3. The magnetic field strength, in milligauss, of the east/west channel is represented by the X-axis, and the magnetic field strength, in milligauss, of the north/south channel is represented by the Y-axis. As mentioned above, the plotted channel data of a properly calibrated compass creates a perfect circle centered around the origin of the coordinate plane when the vehicle travels in a 360° loop, as indicated by graph A of FIG. 1. The radius of the circle represents the earth's magnetic field strength, and the vehicle's compass heading at a particular time during travel is represented by a point on the circle. By calculating the angle which the point forms with the X-Y coordinate plane, the compass heading of the vehicle may be determined. If a change in vehicular magnetism occurs, the magnetic field sensed by the compass channels when the vehicle is heading in a given direction will be either greater or lesser than that expected for a vehicle with no magnetic interference. As such, the plot of digital sensor data will be shifted away from the origin of the coordinate plane in some direction, and will result in a circle such as that shown by graph B of FIG. 1 when the vehicle travels a 360° loop.

The programming for microprocessor 42 analyzes the digital sensor data supplied by interface circuit 44 in terms of its position on the X-Y coordinate plane. In order to account for changes in vehicular magnetism, the automatic and continuous calibration system disclosed in U.S. Pat. No. 4,953,305 is implemented. The programming of this calibration system is shown by the flow diagrams of FIGS. 7-15 and are in many respects identical to that provided and described in detail in the above-mentioned patent and, therefore, is not discussed in detail here.

Figure 9:
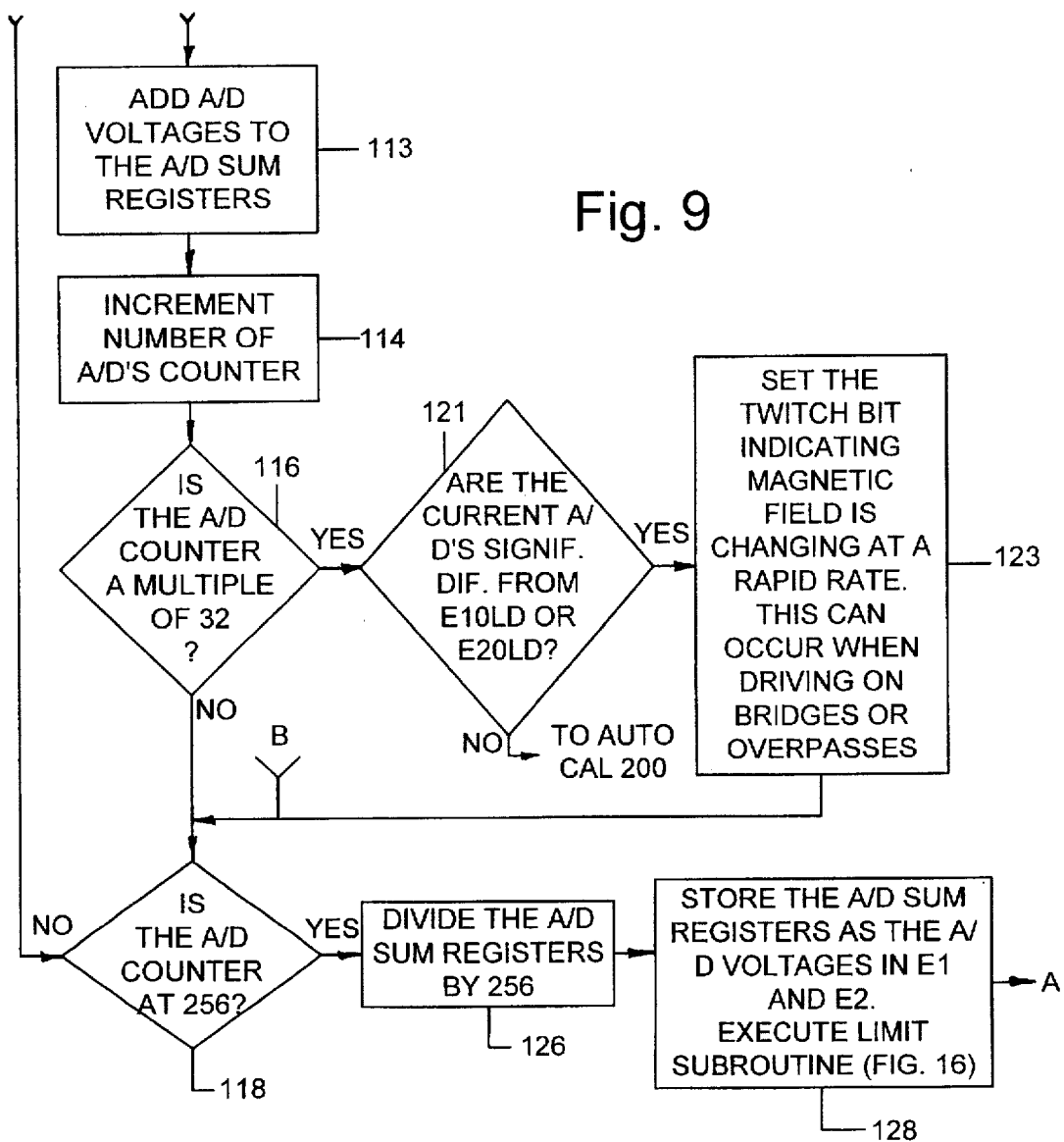
Figure 10:
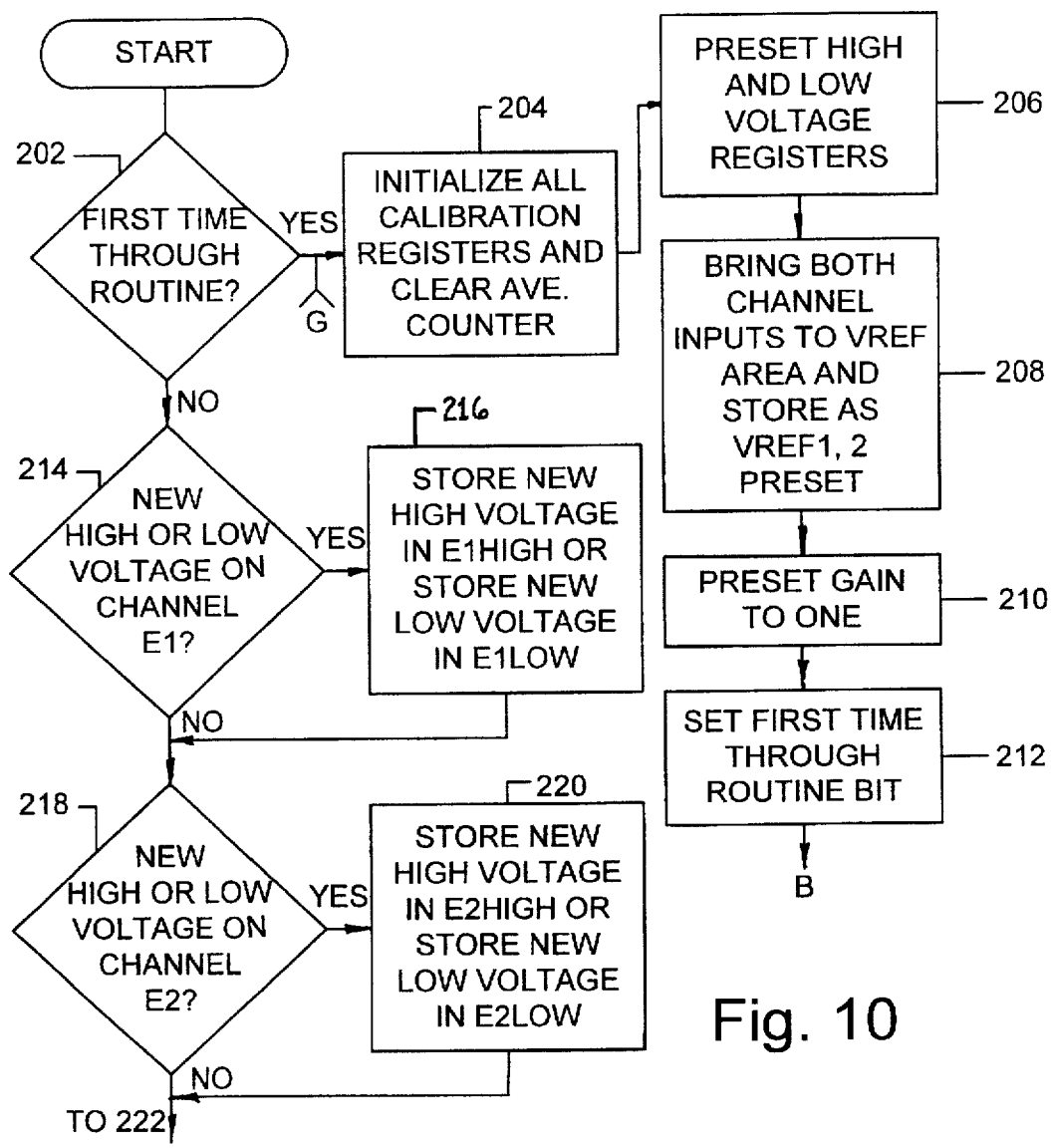
Figure 11:
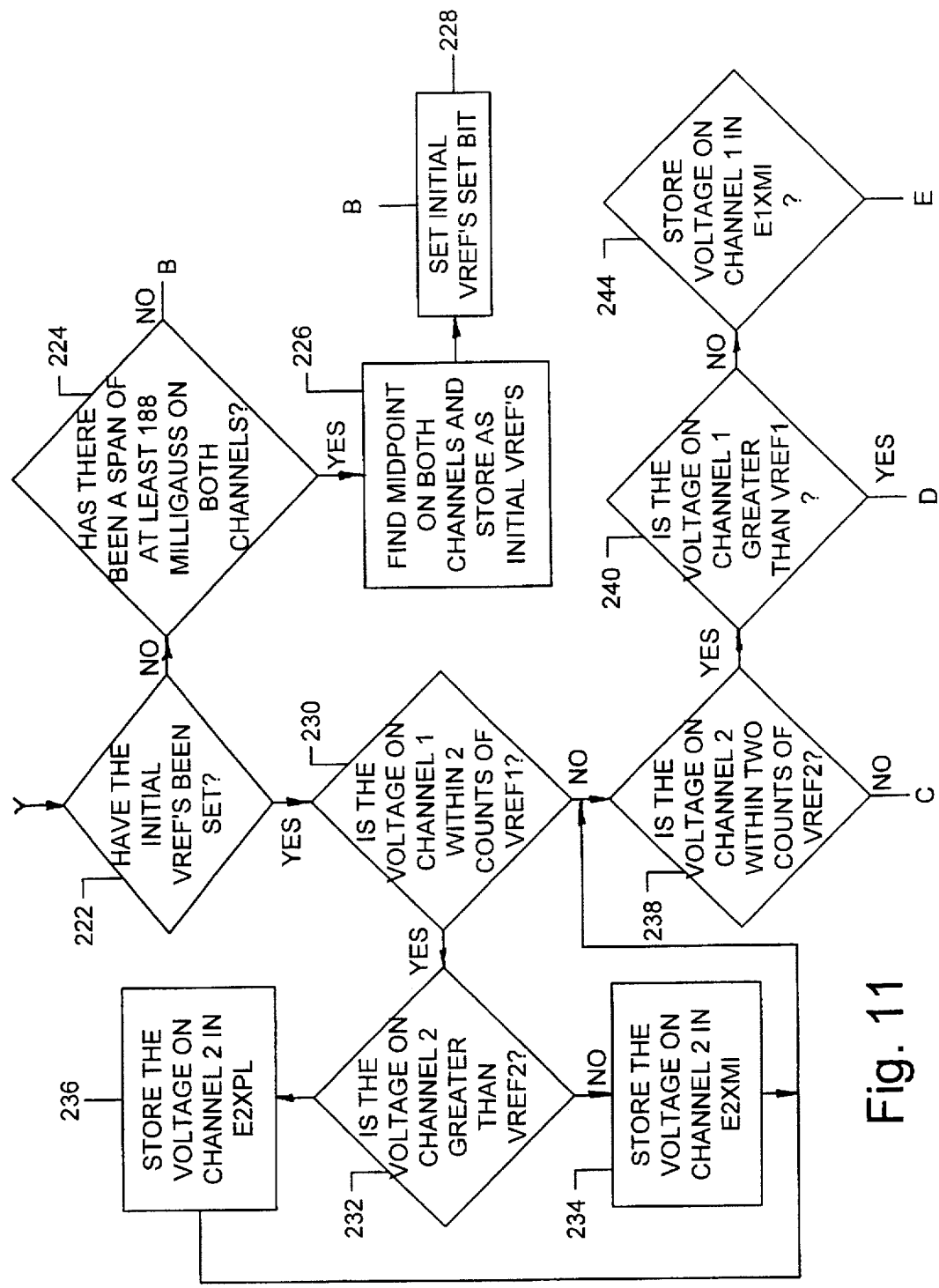
Figure 12:
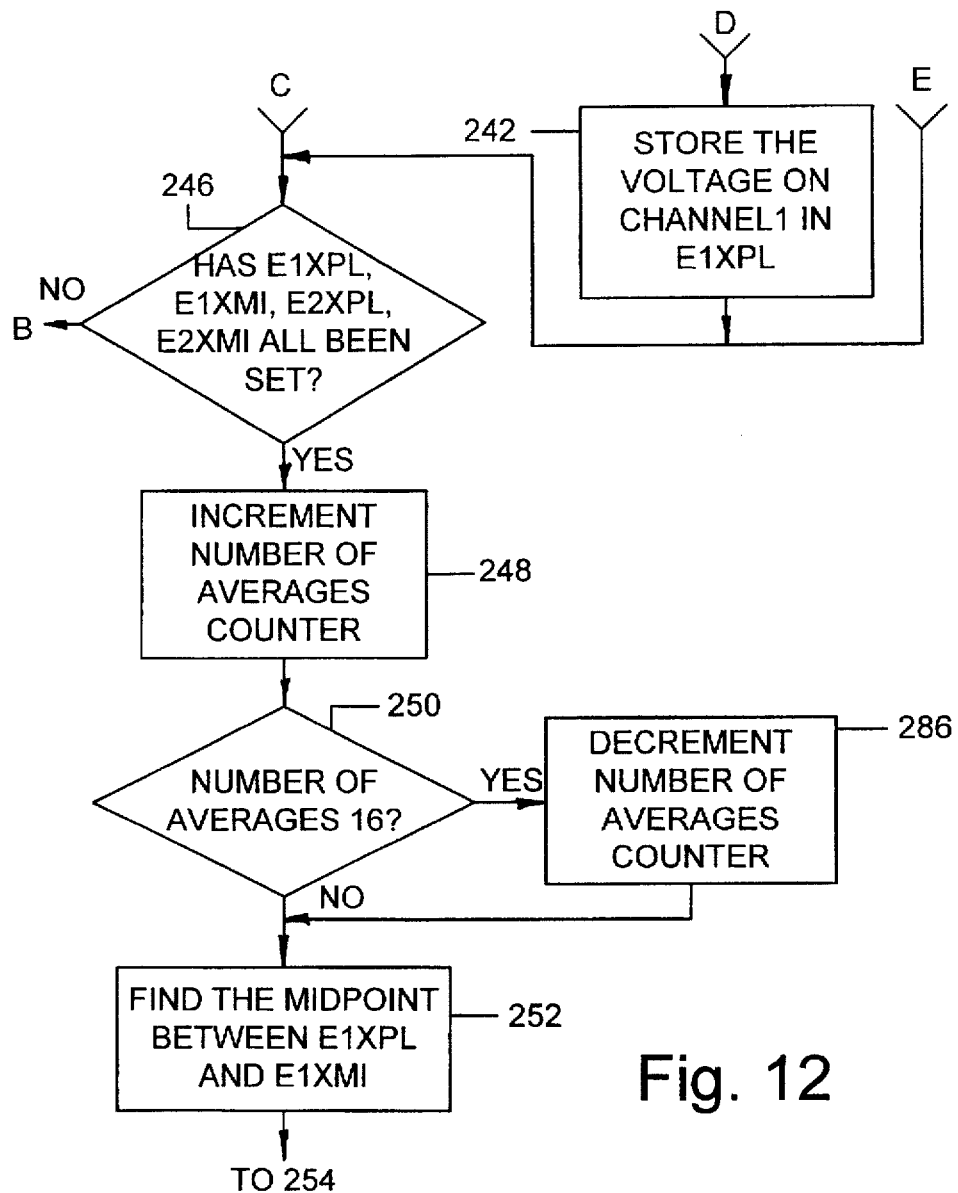
Figure 13:
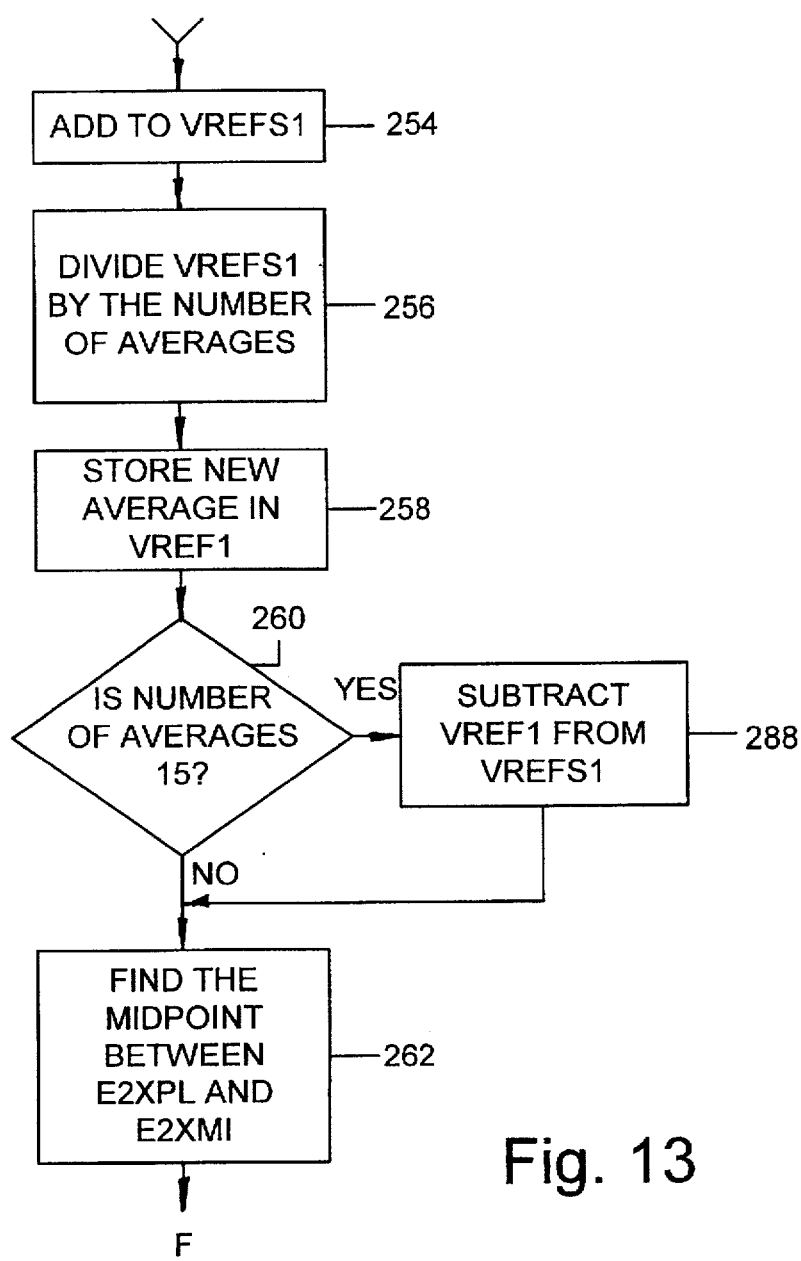

Block 204 of FIG. 10 of the programming for microprocessor 42 is the point at which the reinitiation of the calibration system begins which, as described in the above-mentioned patent, involves the collecting and centering of spans of sensor data followed by the collecting and centering of two circles of sensor data which causes the origin of the coordinate plane to coincide with the center of the circular plot of sensor data. This reinitiation process enables the compass system to recover from any change in vehicular magnetism, and can be accessed from other locations within the compass system programing via arrow G that leads into block 204. In order to more quickly recover from intermediate changes in vehicular magnetism that cause a shift in sensor data such as that shown by graph D of FIG. 3, block 128 of FIG. 9 and block 270 of FIG. 14 have been modified from that disclosed in the above-mentioned patent to include the programming shown by the new flow diagrams of FIGS. 16-18. Block 128 of FIG. 9 has been modified so as to execute the LIMIT subroutine 500 of FIG. 16 in addition to the original step of storing the average sensor data in registers E1 and E2. The original step of block 270 of FIG. 14 uses the channel spans to calculate the GAIN, as described in the above-mentioned patent. Block 270 has been modified so as to also execute the SPANCALC subroutine 542 of FIG. 18 which explicitly stores the calculated channel spans into variables so that they can be referenced in the LIMITCHECK subroutine 520 of FIG. 17. The general operation of the compass system in accordance with the additional programming of the flow diagrams of FIGS. 16-18 is now described.

Figure 4:
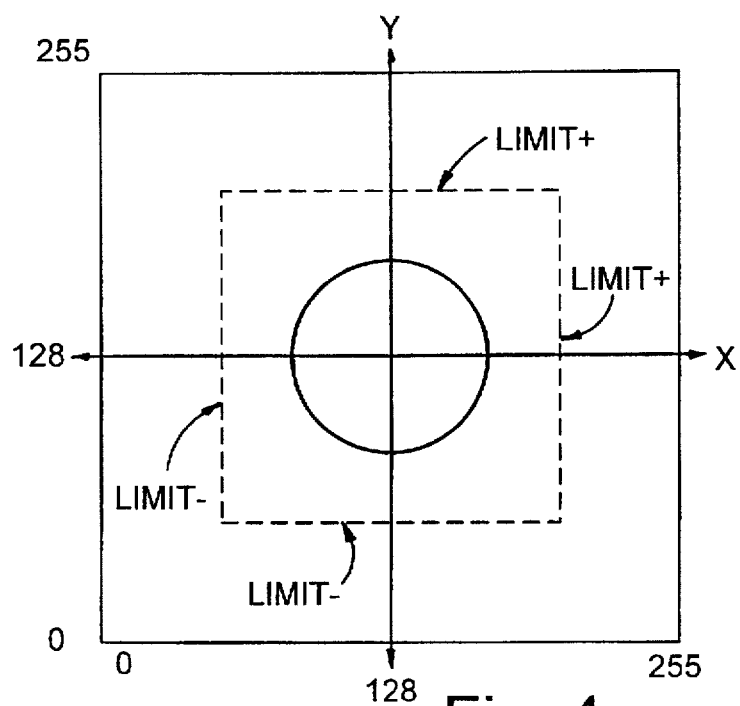
FIG. 4 a graph illustrating the variable threshold limits provided by the present invention.
Figure 16:
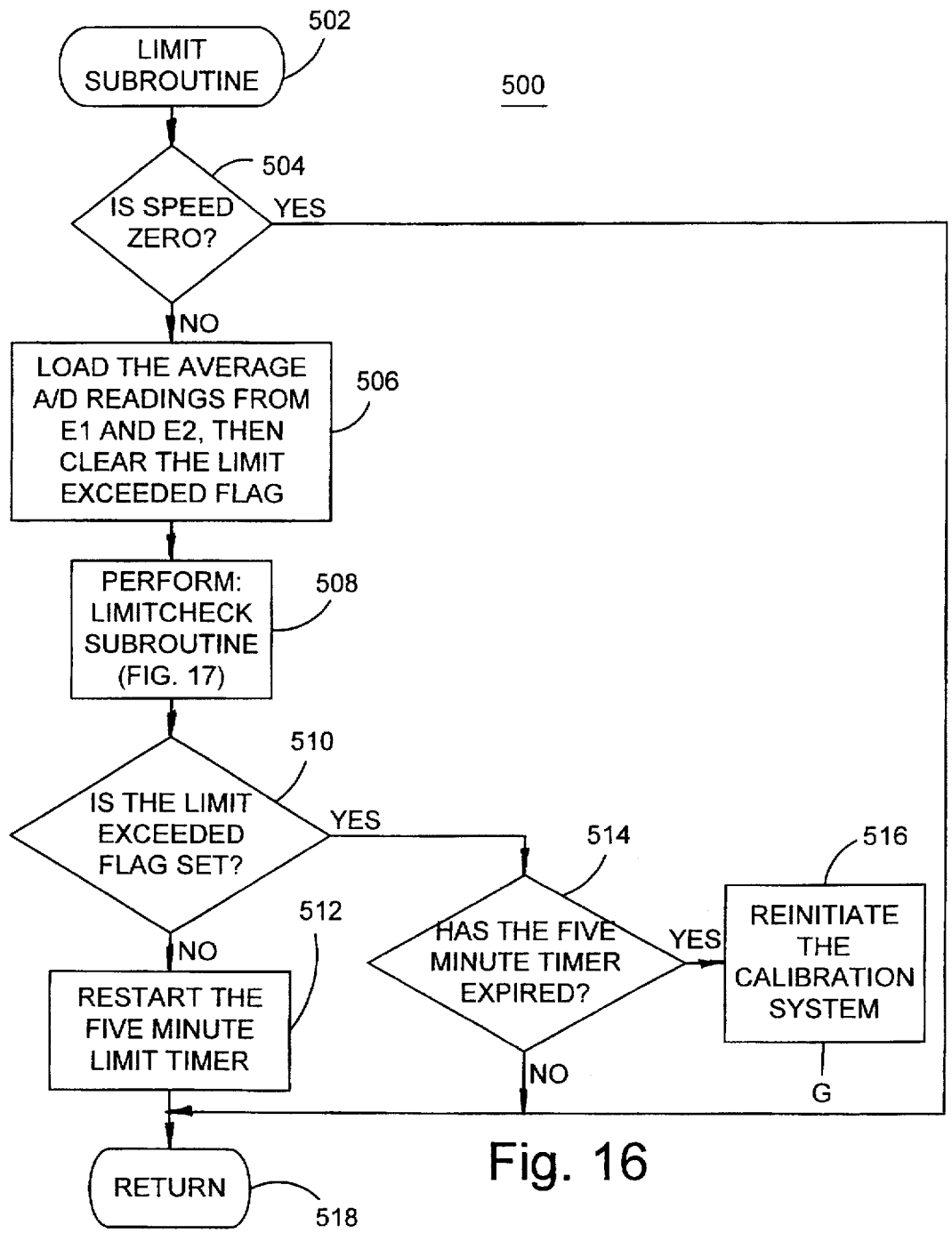
Figure 17:
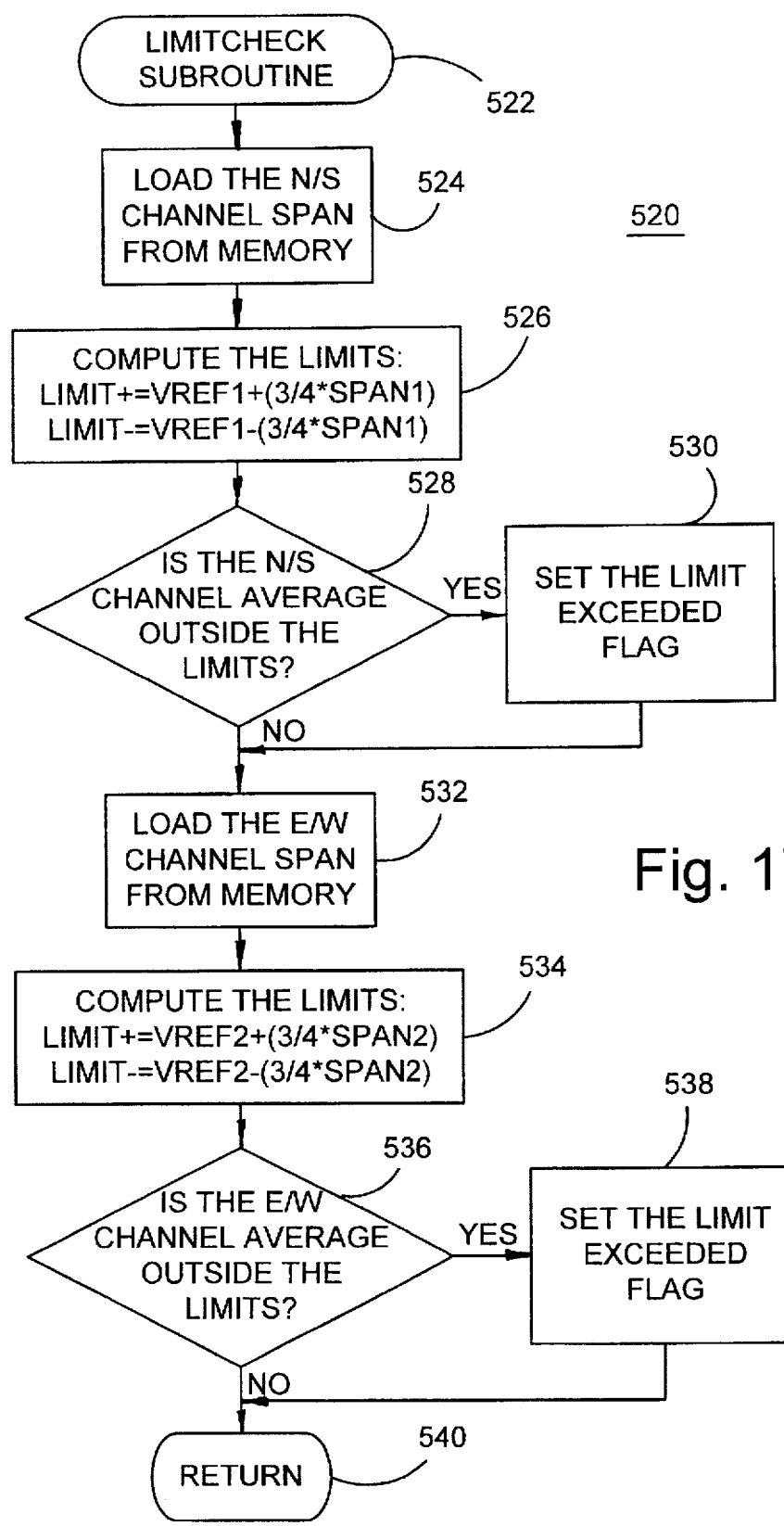
Figure 18:
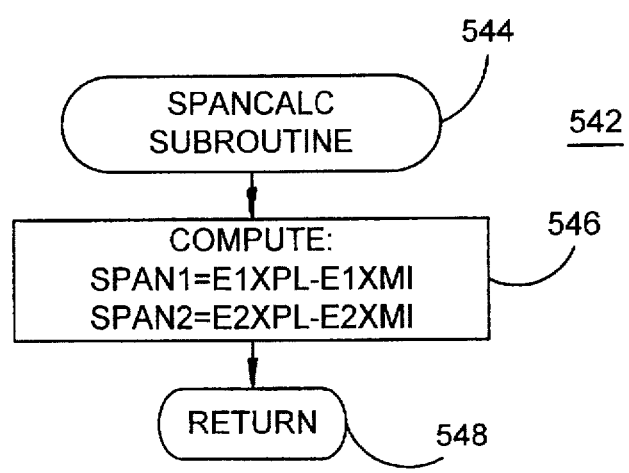

The programming associated with the flow diagrams of FIGS. 16-18 enables the compass system to more quickly recover from intermediate changes in vehicular magnetism by establishing a variable threshold around the origin of the X-Y coordinate plane as shown by the dashed line of FIG. 4. This threshold is essentially a square and is formed by calculating threshold limits, LIMIT+ and LIMIT−, in both the X and Y measurement directions. Each of these four threshold limits is established at a distance away from the origin of the X-Y coordinate plane that is equal to, in the preferred embodiment, 1½ times the radius (or ¾ the diameter) of the last circle of plotted sensor data. Because the radius of a plotted circle of sensor data represents the earth's magnetic field strength which may change over time as the vehicle changes latitude, these threshold limits vary as a function of the detected earth's magnetic field strength. The threshold limits are positioned so that, regardless of the earth's magnetic field strength, at least a portion of the circular plot of shifted sensor data after an intermediate or larger change in vehicular magnetism (one that causes the origin of the coordinate plane to not be contained within the subsequent circular plot of sensor data) falls outside of the threshold. If the heading of the vehicle is such that the plot of current sensor data is outside of these threshold limits for a continuous predetermined period of time (five minutes in the preferred embodiment), then the calibration system of the compass is reinitiated. This reinitiation is much quicker than the fifteen ignition cycles of at least five minutes duration to be completed as in the prior art and eliminates the need to compare the plot of sensor data with the saturation limits of the compass system. However, some changes in vehicular magnetism may cause the sensor data to shift such that the threshold is crossed even though the plot of shifted sensor data still contains the origin of the coordinate plane when the vehicle travels a 360° loop. In these circumstances, the recovery of the compass system depends on the driving pattern of the vehicle. If the heading of the vehicle is such that the plot of current sensor data is outside of the threshold limits for a continuous period of five minutes, then the calibration system will be reinitiated as mentioned above. If, however, the vehicle completes a 360° loop before spending five continuous minutes outside of the threshold, then the compass system will recover by normal operation of the calibration system of the above-mentioned patent. A detailed description of the additional programming for microprocessor 42 is now provided in connection with the flow diagrams of FIGS. 16–18.

In discussing the flow diagrams of FIGS. 16–18 for the programming of microprocessor 42, the following symbols and their definitions are used (with all except the last three of these symbols having been used and described in the above-mentioned patent):

E1: A register or buffer that stores the average A/D voltage readings of the north/south channel data.

E2: A register or buffer that stores the average A/D voltage readings of the east/west channel data.

VREF1: A variable that stores the midpoint of the voltage readings on the north/south channel. Any changes in the static magnetic field of the vehicle will cause this variable to change.

VREF2: A variable that stores the midpoint of the voltage readings on the east/west channel. Any changes in the static magnetic field of the vehicle will cause this variable to change.

E1XPL: A variable that stores the most recent A/D voltage reading on the north/south channel that was above the value of variable VREF1 when the east/west channel was at the value stored in variable VREF2.

E1XMI: A variable that stores the most recent A/D voltage reading on the north/south channel that was below the value of variable VREF1 when the east/west channel was at the value stored in variable VREF2.

E2XPL: A variable that stores the most recent A/D voltage reading on the east/west channel that was above the value of variable VREF2 when the north/south channel was at the value stored in variable VREF1.

E2XMI: A variable that stores the most recent A/D voltage reading on the east/west channel that was below the value of variable VREF2 when the north/south channel was at the value stored in variable VREF1.

SPAN1: A variable that stores the north/south channel span of the last circle of plotted sensor data.

SPAN2: A variable that stores the east/west channel span of the last circle of plotted sensor data.

Limit exceeded flag: A flag that is set if the sensor data in at least one of buffers E1 and E2 is outside of the variable threshold.

Referring first to FIG. 16, shown is the LIMIT subroutine 500 of the compass program. In the preferred embodiment, this routine is executed in block 128 of FIG. 9 of the programmming of the above-mentioned patent. After block 502 which signifies the beginning of the LIMIT subroutine 500, block 504 determines if the speed of the vehicle is zero. Microprocessor 42 obtains this information by means of connection to speed sensor 46 (FIG. 6). Information relating to whether the vehicle is moving or not is important because a reinitiation of the calibration system is undesirable if the vehicle is parked next to an object that temporarily affects the sensed magnetic field. If block 504 determines that the speed of the vehicle is zero, then the program proceeds to block 518 to exit the subroutine. If block 504 determines that the speed of the vehicle is not zero such that a reinitiation of the compass system may be desirable, then block 506 loads the average A/D readings from buffers E1 and E2 into an arithmetic register, and clears the limit exceeded flag to reinitialize it for the following program blocks. After block 506, block 508 executes the LIMITCHECK subroutine 520 which determines if the sensor data in at least one of buffers E1 and E2 is outside of the variable threshold. This subroutine is described in greater detail below in connection with FIG. 17. Upon return from the LIMITCHECK subroutine 520, block 510 determines if the limit exceeded flag is set. The limit exceeded flag is set in the LIMITCHECK subroutine 520 if the sensor data in at least one of buffers E1 and E2 is outside of the variable threshold. If block 510 determines that the limit exceeded flag is not set, then block 512 restarts a five-minute limit timer by resetting it to five minutes. This timer keeps track of the time period during which the sensor data is outside of the variable threshold. Such a timer is available within the HC05 Motorola microprocessor 42 and is continually running according to the microprocessor's clock frequency. After block 512, the program proceeds to block 518 which causes the subroutine to be exited. If block 510 determines that the limit exceeded flag is set, then block 514 determines if the five-minute timer has expired (i.e. counted down to zero). If the five-minute timer has not expired, then the program proceeds to block 518 whereupon the subroutine is exited. If block 514 determines that the timer has expired, then block 516 causes the calibration system to be reinitiated by branching via arrow G to block 204 of FIG. 10.

Referring now to FIG. 17, shown is the LIMITCHECK subroutine 520 which is executed in block 508 of the LIMIT subroutine 500. This subroutine determines if the sensor data in at least one of buffers E1 and E2 is outside of the variable threshold. After block 522 which signifies the beginning of the subroutine, block 524 loads the north/south channel span of the last circle of plotted sensor data, stored in variable SPAN1, into an arithmetic register. The value of variable SPAN1 is calculated in the SPANCALC subroutine 542 which is described below in connection with FIG. 18. Next, block 526 calculates the variable threshold limits in the north/south channel of measurement. These limits are stored in variables LIMIT+ and LIMIT− according to the following equations:

$$\text{LIMIT+} = \text{VREF1} + (\tfrac{3}{4} \times \text{SPAN1})$$

$$\text{LIMIT}- = \text{VREF1} - (\tfrac{3}{4} \times \text{SPAN1})$$

Next, block 528 determines if the north/south channel average stored in buffer E1 is greater than the value of variable LIMIT+ or less than the value of variable LIMIT−. If either of these conditions is satisfied, then the north/south channel average is outside of the threshold limits and the program proceeds to block 530. Block 530 sets the limit exceeded flag to indicate that the variable threshold has been exceeded. After block 530, or if block 528 determines that the north/south channel average stored in buffer E1 is not outside of the threshold limits, the program proceeds to block 532. Block 532 loads the east/west channel span of the last circle of plotted sensor data, stored in variable SPAN2, into an arithmetic register. The value of variable SPAN2 is calculated in the SPANCALC subroutine 542 of FIG. 18. Next, block 534 calculates the variable threshold limits in the east/west channel of measurement. These limits are again stored in variables LIMIT+ and LIMIT− according to the following equations:

$$\text{LIMIT}+ = \text{VREF2} + (\tfrac{3}{4} \times \text{SPAN2})$$

$$\text{LIMIT}- = \text{VREF2} - (\tfrac{3}{4} \times \text{SPAN2})$$

After block 534, block 536 determines if the east/west channel average stored in buffer E2 is greater than the value of variable LIMIT+ or less than the value of variable LIMIT−. If either of these conditions is satisfied, then the east/west channel average is outside of the threshold limits and the program proceeds to block 538. Block 538 ensures that the limit exceeded flag is set (may have been set in block 530) to indicate that the variable threshold has been exceeded. After block 538, or if block 536 determines that the east/west channel average stored in buffer E2 is not outside of the threshold limits, the program proceeds to block 540 which causes the subroutine to be exited.

Figure 14:
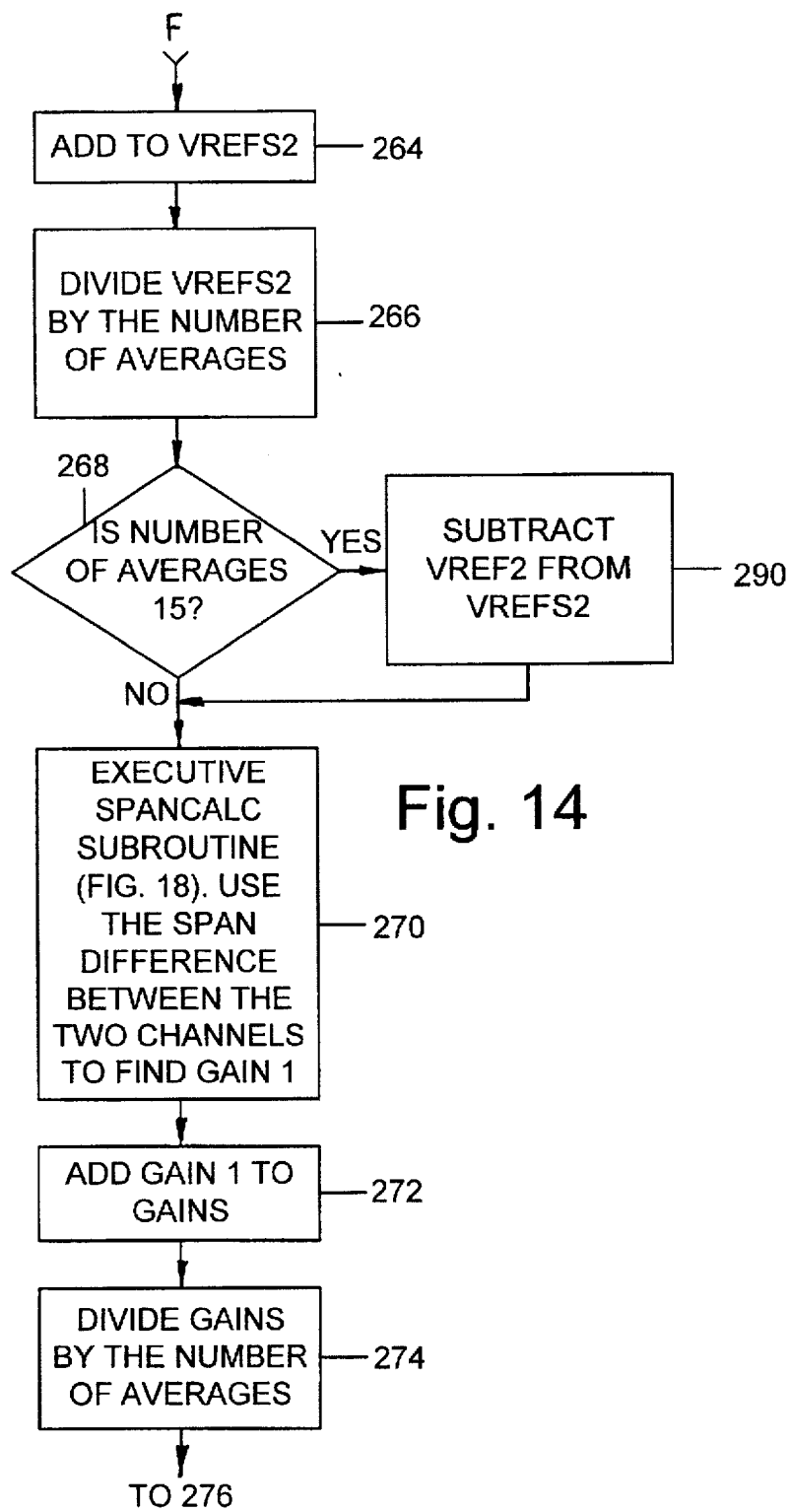
Figure 15:
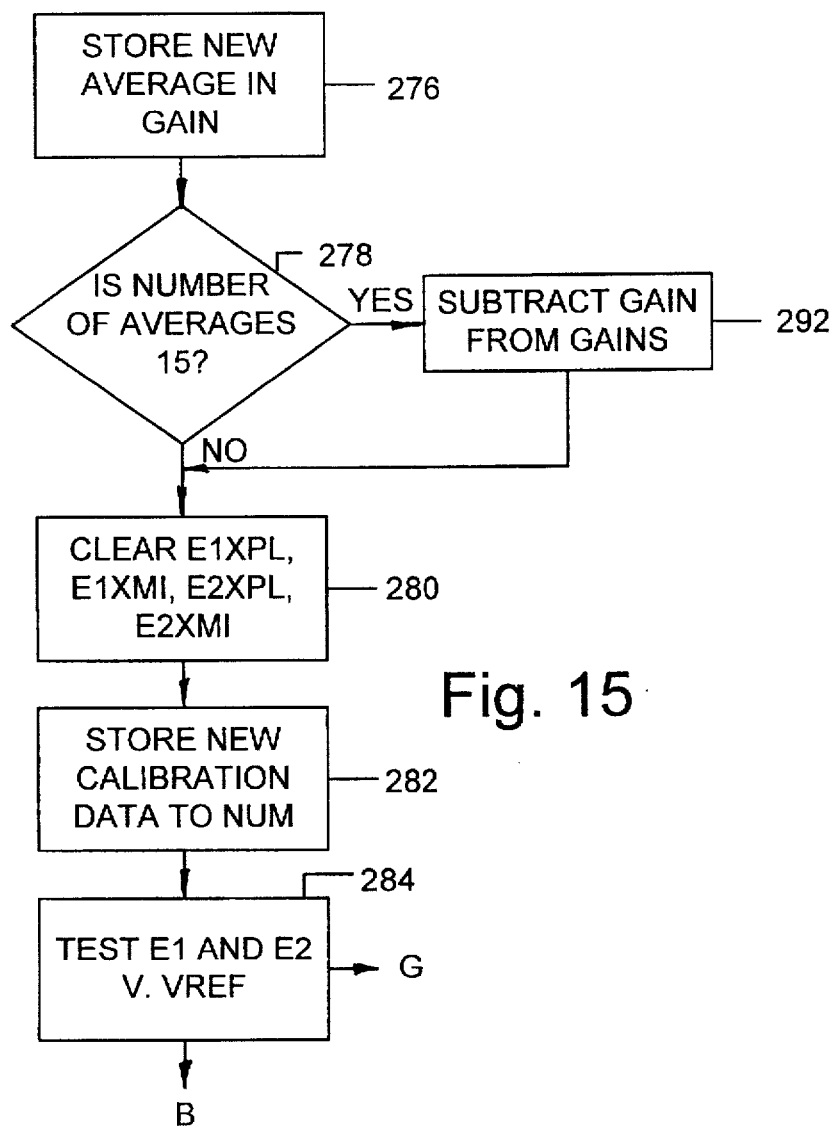

Shown in FIG. 18 is the SPANCALC subroutine 542 which, in the preferred embodiment, is executed in block 270 of FIG. 14 of the programming of the above-mentioned patent. After block 544 which signifies the beginning of the subroutine, block 546 calculates the north/south and east/west channel spans of the last circle of plotted sensor data. These spans are stored in variables SPAN1 and SPAN2 and are calculated according to the following equations:

$$\text{SPAN1} = \text{E1XPL} - \text{E1XMI}$$

$$\text{SPAN2} = \text{E2XPL} - \text{E2XMI}$$

After block 546, the subroutine exits via block 548.

Four threshold limits and the value of ¾ the diameter of the last circle of plotted sensor data are used to calculate the position of the threshold limits in the preferred embodiment. However, other means of forming the threshold may be used in which preferably at least a portion of the circular plot of shifted sensor data after an intermediate or larger change in vehicular magnetism (one that causes the origin of the coordinate plane to not be contained within the subsequent circular plot of sensor data) falls outside of the threshold. For example, a different predetermined multiple of the circle diameter may be used so that, when the circular plot of shifted sensor data still contains the origin of the coordinate plane, the threshold is crossed in as few situations as possible so that the compass system can preferably recover by normal operation of the calibration system. Furthermore, more than four threshold limits may be used so that the threshold approximates a circle instead of a square. Such a threshold can be implemented by calculating the distance between each point of current plotted sensor data and the origin of the coordinate plane and by comparing this distance to a predetermined distance value which is a predetermined multiple of the diameter of the last circle of plotted sensor data. In the preferred embodiment of such a circular threshold, the predetermined distance value is equal to the diameter of the last circle of plotted sensor data (which represents twice the earth's magnetic field strength) so that the threshold is crossed only when the plot of shifted sensor data does not contain the origin of the coordinate plane when the vehicle travels a 360° loop.

Figure 7:
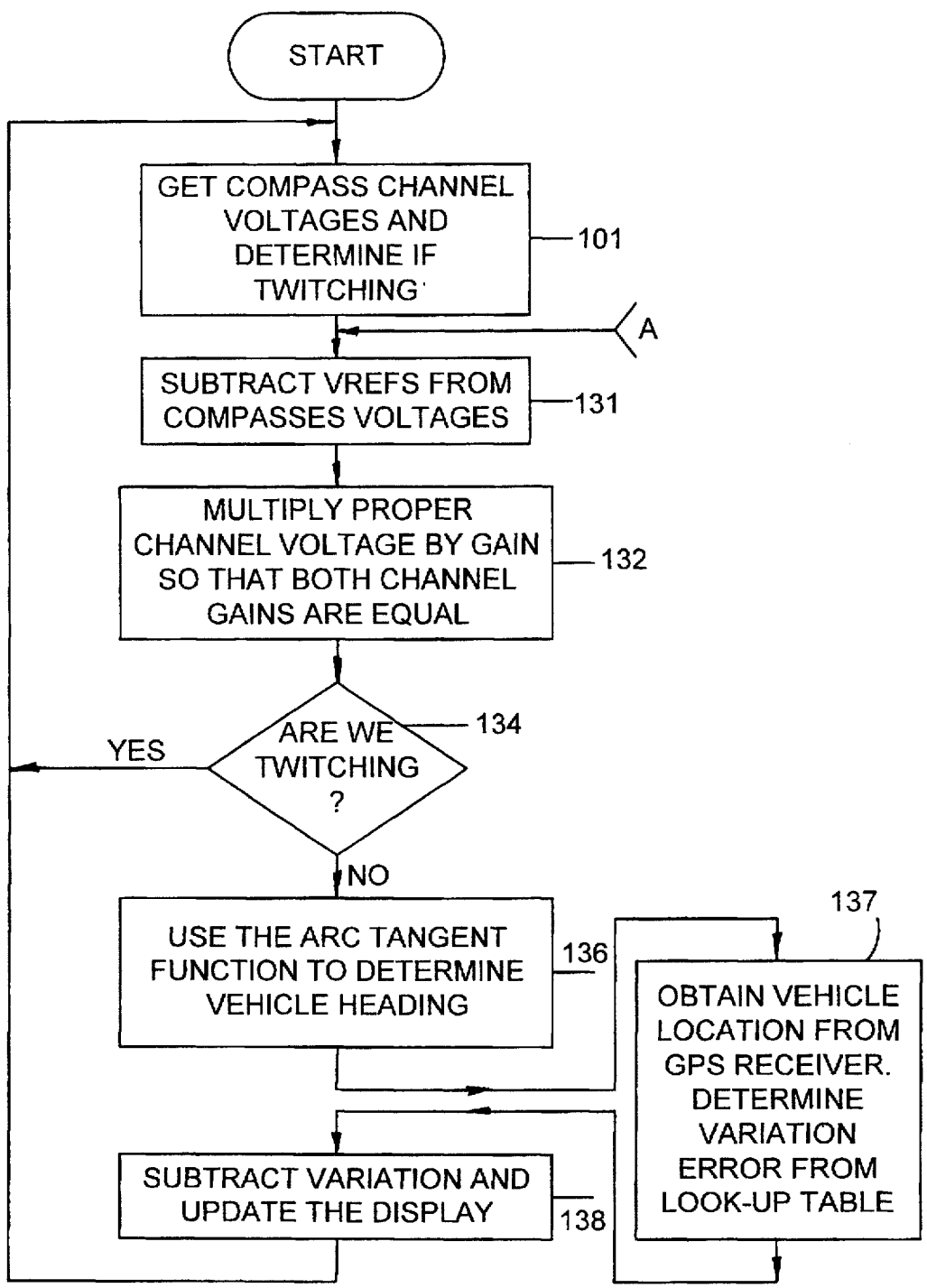
FIGS. 7–18 are the flow diagrams for the programming of the microprocessor employed in the compass system of the preferred embodiment of the present invention.
Figure 8:
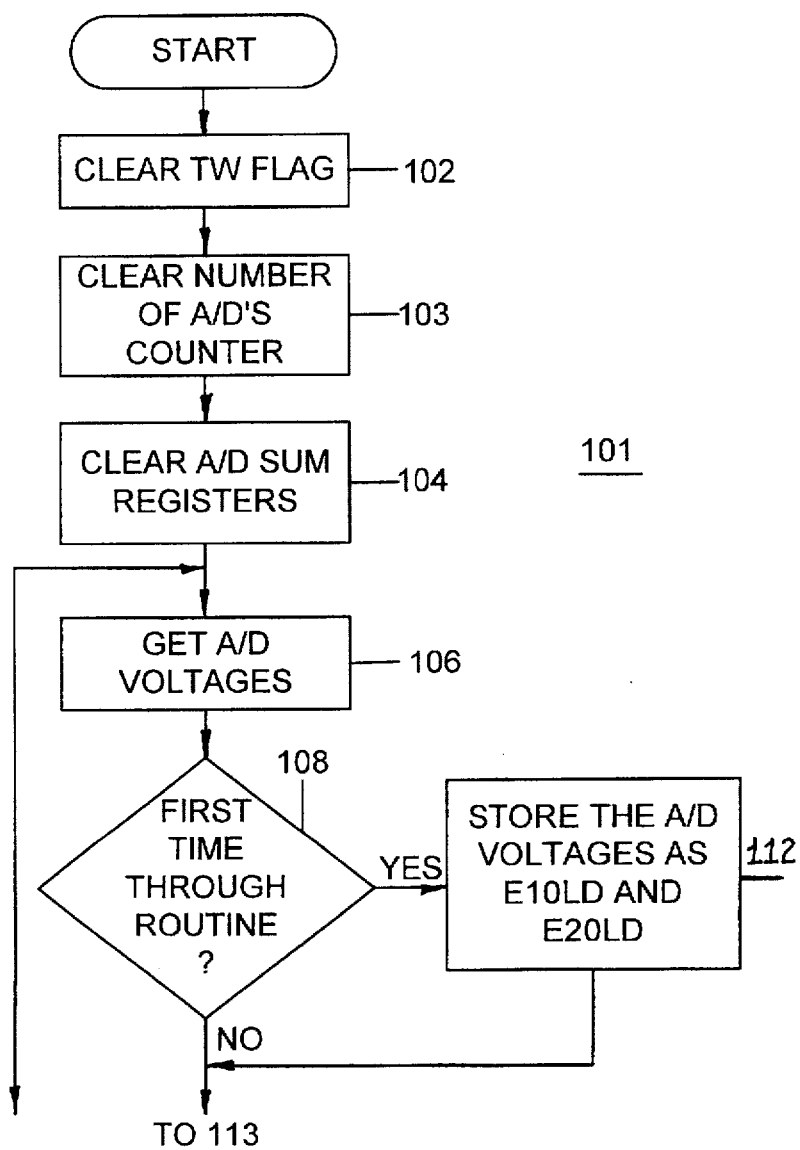

In addition to the modification of block 128 of FIG. 9 and block 270 of FIG. 14 in order to include the programming of the new flow diagrams of FIGS. 16–18, the flow diagram of FIG. 7 has been modified from that disclosed in U.S. Pat. No. 4,953,305 so as to provide a compass system that can automatically adjust for changes in the geographic area of operation of the vehicle so that appropriate variation correction can be continually provided. As described in the above-mentioned patent, block 138 of FIG. 7 is the programming block where the variation error, stored in nonvolatile memory circuit 48, is subtracted from the compass signal before the display of the vehicle heading is updated. This corrects for variations in the earth's magnetic field from true north which is experienced in different geographic areas. However, unlike the programming of the above-mentioned patent, a block 137 has now been included between blocks 136 and 138, as shown in FIG. 7. Block 137 continually obtains the latitude and longitude data representing the geographic location of the vehicle from a GPS receiver 47 (FIG. 6) and determines from this vehicle location data, using a look-up table of known variation correction values stored in nonvolatile memory circuit 48, the variation zone occupied by the vehicle and the corresponding variation error value. Thus, the program automatically adjusts the variation correction continuously as provided by block 138 regardless of the geographic area of operation of the vehicle.

Figure 19:
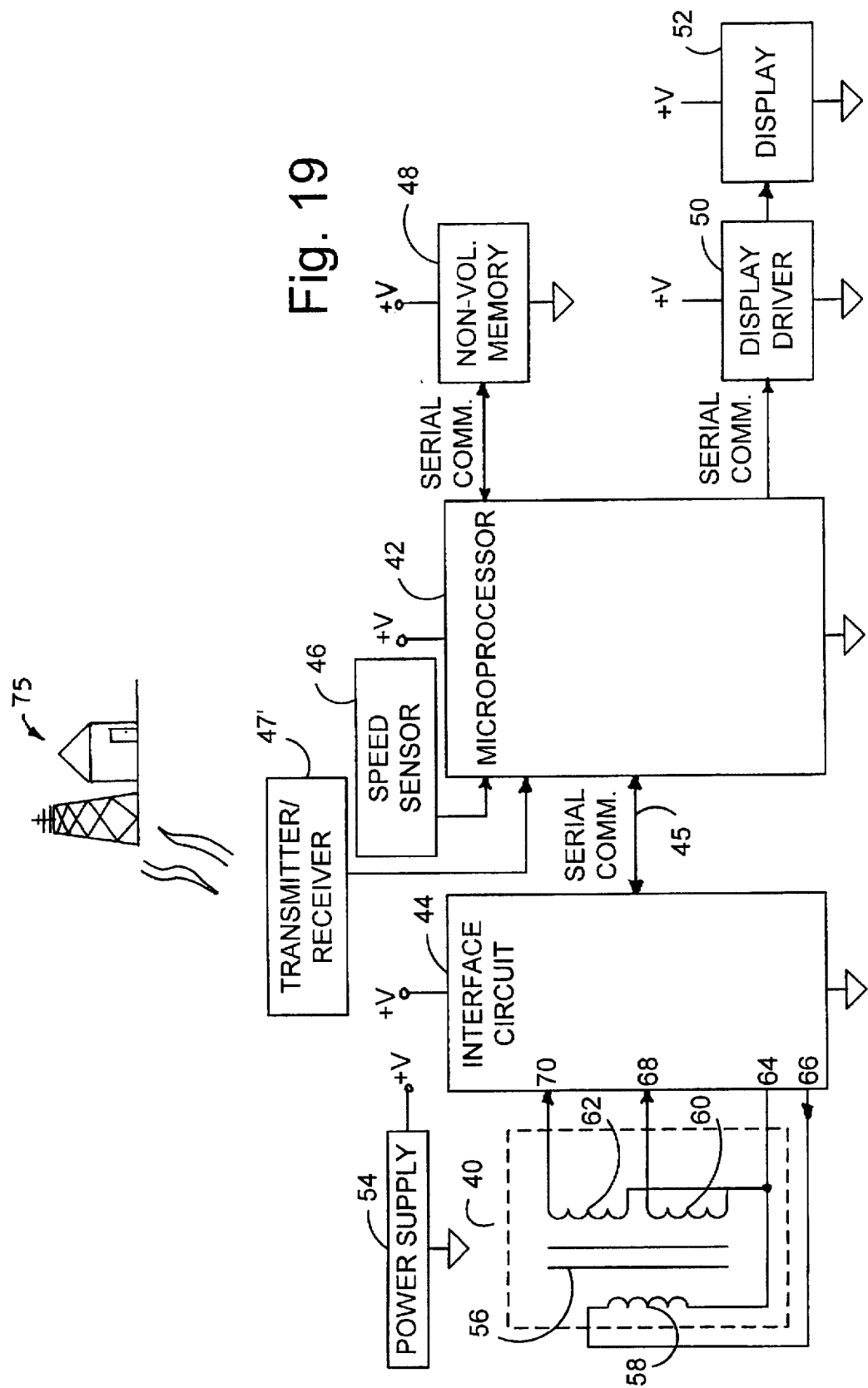
FIG. 19 an electrical circuit diagram of an alternate embodiment of the compass system.
Figure 20:
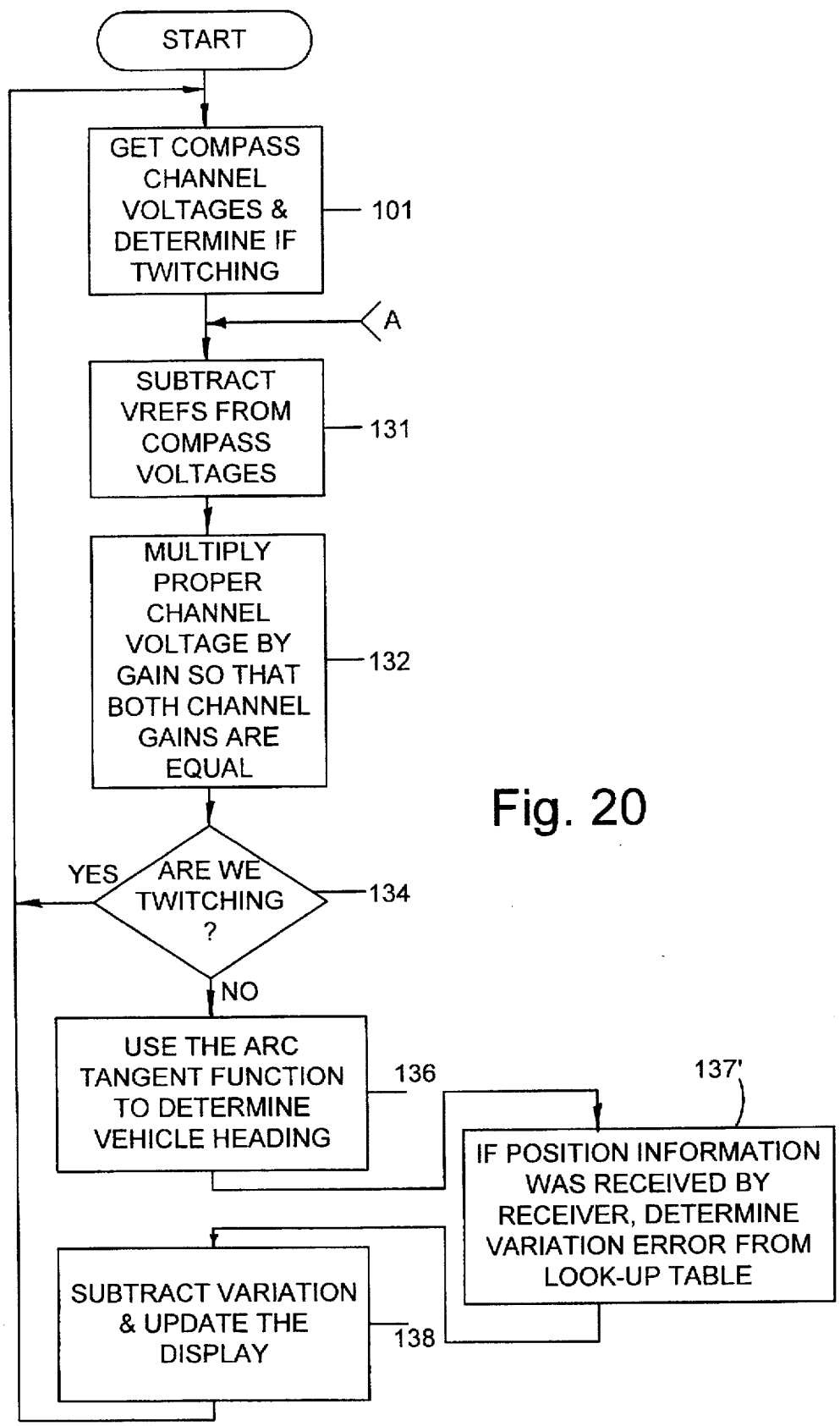

Shown in FIG. 19 is an alternate embodiment of the compass system of the present invention in which GPS receiver 47 is replaced by a conventional RF transmitter/receiver or communication circuit 47' which is capable of communication with remote communication stations 75. Remote land-based stations 75 are located in each of the different variation zones, and are positioned such that the remote station closest to the vehicle is in the same variation zone as the vehicle. In this embodiment, the operator of the vehicle can request information relating to variation correction by operating one of buttons or actuators 38 of console 12 (FIG. 5). Normally, such a request would be made when the geographic area of operation of the vehicle is undergoing charge due to extensive travel. By pressing the appropriate button 38, a request signal is transmitted by transmitter/receiver 47' which is received by the remote station 75 closest to the current location of the vehicle. In response to the request signal, remote station 75 generates an information signal that provides the latitude and longitude position information of the remote station. This information signal is received by transmitter/receiver 47' and, via the programming of modified block 137' of FIG. 20, the compass system determines from this data the variation zone occupied by the vehicle and the corresponding variation error value using a look-up table stored in nonvolatile memory circuit 4S. This alternate embodiment also enables the variation error to be conveniently adjusted by the operator of the vehicle so that appropriate variation correction can be provided regardless of the geographic area of operation of the vehicle and without requiring the operator to know the current variation zone.

The above description is considered that of the preferred embodiments only. Modifications of the invention will occur to those skilled in the art and to those who make or use the invention. Therefore, it is understood that the embodiments shown in the drawings and described above are for illustrative purposes and are not intended to limit the scope of protection of the invention, which is defined by the following claims as interpreted according to the principles of patent law.

The embodiments of the invention in which an exclusive property or privilege is claimed are defined as follows:

1. An electrical compass system for a vehicle, comprising:
   a magnetic field sensor for detecting the earth's magnetic field and for providing electrical signals representative thereof;
   a processing circuit coupled to said sensor for processing said electrical signals from said sensor and for providing display output signals in response thereto representative of the vehicle heading, said processing circuit including a calibration routine for correcting for display errors due to vehicle magnetism, said calibration routine re-calibrates the compass system based upon the electric signals output from said magnetic field sensor;
   a display circuit coupled to said processing circuit and responsive to said display output signals for displaying the vehicle heading; and
   said processing circuit monitoring said electrical signals from said sensor and reinitializing said calibration routine when said processing circuit determines that the detected signal levels from said sensor have shifted such that said signal levels are outside of a variable threshold, said processing circuit varying said variable threshold in response to a sensed chance in the strength of the earth's magnetic field so as to maintain said variable threshold at a level that is a predetermined multiple of the strength of the earth's magnetic field.

2. The compass system as defined in claim 1 wherein said calibration routine includes determining the maximum and minimum of said detected signal levels during movement of the vehicle through a 360° loop.

3. The compass system as defined in claim 2 wherein said variable threshold includes at least four threshold limits to which said processing circuit compares the maximum and minimum detected signal levels when determining whether to reinitialize the calibration routine.

4. The compass system as defined in claim 3 wherein said variable threshold is 1½.

5. The compass system as defined in claim 1 and further including a location detection circuit for determining the location of the vehicle and wherein said location detection circuit is coupled to said processing circuit which responds to vehicle location information to correct said display output signals for magnetic variation.

6. The compass system as defined in claim 5 wherein said location detection circuit is a GPS receiver.

7. The compass system as defined in claim 1 wherein said calibration system is reinitiated when said processing circuit determines that the detected signal levels are outside of said variable threshold for a predetermined period of time.

8. The compass system as defined in claim 7 wherein said predetermined period of time is about five minutes.

9. The compass system as defined in claim 1 wherein said magnetic field sensor is a flux-gate sensor.

10. The compass system as defined in claim 1 further including a speed sensor coupled to said processing circuit for generating a signal indicating the speed of the vehicle, and wherein said processing circuit determines if the detected signal levels from said magnetic field sensor are outside of said variable threshold only when said speed signal indicates that the vehicle is moving.

11. The compass system as defined in claim 1 wherein said processing circuit includes a microprocessor.

12. An electrical compass system for a vehicle, comprising:
   a magnetic field sensor for detecting the earth's magnetic field and for providing electrical signals representative thereof;
   a processing circuit coupled to said sensor for processing said electrical signals from said sensor and for providing heading output signals in response thereto representative of the vehicle heading, said processing circuit including a calibration routine for correcting for heading errors due to vehicle magnetism;
   an indicator circuit coupled to said processing circuit and responsive to said heading output signals for providing an indication of the vehicle heading; and
   said processing circuit monitoring said electrical signals from said sensor and reinitializing said calibration routine when said processing circuit determines that the detected signal levels from said sensor have shifted such that said signal levels are outside of a variable threshold, wherein said variable threshold remains unchanged until after each time said processing circuit has completed said calibration routine.

13. The compass system as defined in claim 12 and further including a location determining circuit for determining the location of the vehicle and wherein said location determining circuit is coupled to said processing circuit which responds to vehicle location information to correct said heading output signals for magnetic variation.

14. The compass system as defined in claim 12, wherein said indicator circuit is a display.

15. For use in a vehicle compass system having a magnetic field sensor for providing electrical signals representing the earth's magnetic field, a processing circuit for processing said electrical signals and implementing a calibration system for calibrating the compass system to account for changes in vehicular magnetism, and wherein said calibration system is capable of reinitiation which enables the compass system to recover from any change in vehicular magnetism, a method of recovering from a change in vehicular magnetism comprising:
   establishing a variable threshold which encompasses all detected signals levels for each possible vehicle heading for a properly calibrated compass system;
   determining whether the detected signal levels from said sensor have shifted such that said signal levels are outside of said variable threshold; and
   reinitiating the calibration system if the detected signal levels are outside of said variable threshold, wherein said processing circuit establishes said variable threshold by establishing threshold limits a distance away from the origin of an origin of a coordinate plane about which the system is calibrated, but is equal to a predetermined multiple of the earth's magnetic field strength.

16. The method as defined in claim 15 wherein said predetermined multiple is 1½.

17. The method as defined in claim 15 wherein said determining step includes determining the time period during which the detected signal levels are outside of said variable threshold, and wherein said reinitiating is undertaken when said time period is greater than a predetermined period of time.

18. The method as defined in claim 17 wherein said predetermined period of time is five minutes.

19. An electrical compass system for use in a vehicle, said system including a sensor for sensing a magnetic field and for providing electrical signals representative thereof, a processing circuit coupled to said sensor for processing said electrical signals and for providing display output signals in response thereto, and a display circuit coupled to said processing circuit and responsive to said display output signals for displaying the vehicle heading, said processing circuit implementing a calibration system in which said processing circuit continuously monitors said electrical signals from said sensor and determines the maximum and minimum detected signal levels of said electrical signals as the vehicle travels through a 360° loop, said processing circuit generating compensating signals in response to said maximum and minimum detected signal levels for correcting said display output signals to display the correct vehicle heading, said calibration system capable of reinitiation which enables the compass system to recover from any change in vehicular magnetism, wherein the improvement comprises:

said processing circuit reinitiating said calibration system when said processing circuit determines that the detected signal levels from said sensor have shifted such that said signal levels fall outside of a threshold window which varies as a function of the sensed earth's magnetic field strength and is concentric with a circular plot of the detected signal levels obtained by said calibration system.

20. The compass system as defined in claim 19 wherein said variable threshold includes at least four threshold limits.

21. The compass system as defined in claim 20 wherein said threshold is equal to a predetermined multiple of the earth's magnetic field strength.

22. The compass system as defined in claim 21 wherein said predetermined multiple is 1½.

23. The compass system as defined in claim 19 wherein said calibration system is reinitiated when said processing circuit determines that the detected signal levels are outside of said variable threshold for a predetermined period of time.

24. The compass system as defined in claim 23 wherein said predetermined period of time is about five minutes.

25. The compass system as defined in claim 19 wherein said processing circuit monitors a plot of the detected signal levels on a coordinate plane, and wherein said processing circuit establishes said variable threshold a predetermined distance away from the origin of said coordinate plane such that at least some of said detected signal levels are outside of said threshold if said plot does not contain the origin of said coordinate plane.

26. The compass system as defined in claim 19 and further including a speed sensor coupled to said processing circuit for generating a signal indicating the speed of the vehicle, and wherein said processing circuit determines if the detected signal levels from said magnetic field sensor are outside of said variable threshold only when said speed signal indicates that the vehicle is moving.

27. The compass system as defined in claim 19 wherein said processing circuit monitors a plot of the detected signal levels on a coordinate plane, and wherein said processing circuit implements said variable threshold by calculating the distance between the current plot of detected signal levels and the origin of the coordinate plane and by comparing said distance to a predetermined distance value that is equal to a predetermined multiple of the earth's magnetic field strength.

* * * * *

UNITED STATES PATENT AND TRADEMARK OFFICE
CERTIFICATE OF CORRECTION

PATENT NO.   :   5,761,094
DATED        :   June 2, 1998
INVENTOR(S)  :   Thomas R. Olson et al.

It is certified that error appears in the above-identified patent and that said Letters Patent is hereby corrected as shown below:

Column 3, line 58, after "FIG. 3" insert --is--.

Column 3, line 61, after "FIG. 4" insert --is--.

Column 4, line 4, after "FIG. 19" insert --is--.

Column 4, line 6, "2" should be --20--.

Column 10, line 50, "charge" should be --change--.

Column 10, line 61, "4S" should be --48--.

Column 11, line 47, "variable threshold" should be --predetermined multiple--.

Signed and Sealed this

Eleventh Day of August 1998

Attest:

BRUCE LEHMAN

*Attesting Officer*          *Commissioner of Patents and Trademarks*